Patented Dec. 10, 1935

2,023,872

UNITED STATES PATENT OFFICE 2,023,872

ETHER DERIVATIVE OF MORPHOLINE ALCOHOLS AND PROCESS FOR MAKING IT

Henry L. Cox and Thomas F. Carruthers, South Charleston, W. Va., assignors to Carbide and Carbon Chemicals Corporation, a corporation of New York No Drawing. Application March 31, 1933, Serial No. 663,864

9 Claims. (Cl. 260—28)

The invention relates to new chemical compounds, especially to certain ether compounds containing the morpholine ring, which may be regarded as substitution derivatives of morpholine alcohols.

This new group of chemicals may be represented by the structural formula

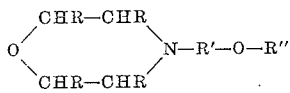

in which R is an alkyl group or hydrogen, R' is an alkylene group, and R'' represents a hydrocarbon residue. From this formula it will be evident that the ether may contain either the normal morpholine ring or one in which one or more hydrogens are replaced by an alkyl group. The R'' group, substituted for a hydroxyl hydrogen, is also preferably an alkyl group although the invention is not limited in this respect.

As a specific example of these ethers one, which may be called ethyl morpholineethyl ether, has the following structural formula

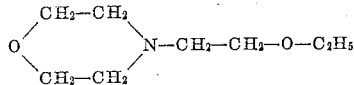

This compound is a liquid having a boiling point of 199° to 200° C. at 750 mm. pressure, or 80° to 81° C. at 10 mm. pressure; a specific gravity of 0.9676 at 20° C., and an index of refraction of 1.4477 at 20° C.

Another of the new compounds including a substituted morpholine ring has the probable structural formula

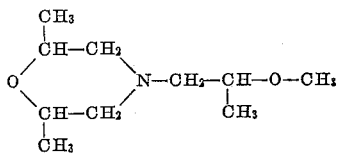

This compound which may be called methyl dimethylmorpholinisopropyl ether, is a liquid having a boiling point of about 40° C. at 12 mm. pressure.

The new compounds of our invention may be regarded as ethers corresponding to morpholine alcohols, and they can be prepared by a reaction in which an alkyl or other hydrocarbon group is substituted for the hydroxyl hydrogen of the appropriate alcohol. Dialkyl sulfates, for example, will react with the alcohol in the presence of an inorganic base, such as sodium carbonate or sodium hydroxide, to form the new ethers.

The compositions particularly mentioned above can be prepared respectively from morpholine ethanol and dimethylmorpholine isopropanol. These alcohols can be made by the dehydration of hydroxyalkylamines. For example morpholine ethanol $(O(CH_2.CH_2)_2:N.CH_2CH_2OH)$ has heretofore been prepared by dehydrating triethanolamine, while dimethylmorpholine isopropanol $(O(CH(CH_3).CH_2)_2:N.CH_2.CH(CH_3).OH)$ can be made by reaction between monoisopropanolamine and dichloroisopropyl ether. The particular manner of forming the alcohol is of no direct concern to the present invention, and it will be evident that other morpholine alcohols than the ones here mentioned may be used as the starting product, depending upon the nature of the ether desired.

As illustrative of our invention the following specific examples are given.

Morpholine ethanol in an amount of 655 grams was mixed with 770 grams of diethyl sulfate. This mixture was slowly added to 415 grams of sodium hydroxide dissolved in approximately the same weight of water, the temperature being maintained at about 100° C. The reaction mixture was cooled and extracted with isopropyl ether. After removing the extractant, the ethyl morpholineethyl ether was purified by distillation, giving 441 grams of the product, or 55% of the theoretical yield.

In substantially the same manner described above dimethylmorpholine isopropanol was etherified with the use of dimethyl sulfate to form methyl dimethylmorpholine isopropyl ether.

We claim:—

1. A compound consisting of ether derivatives of morpholine represented by the structural formula:

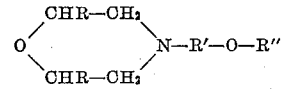

in which R is an alkyl group or hydrogen, R' is an alkylene group, and R'' is an alkyl group.

2. A compound consisting of ether derivatives of morpholine represented by the structural formula

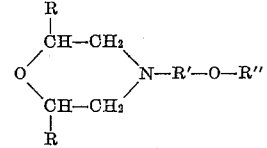

in which R is an alkyl group, R' is an alkylene group, and R'' is an alkyl group.

3. A compound consisting of ether derivatives of morpholine represented by the structural formula

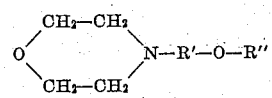

in which R′ is an alkylene group, and R″ is an alkyl group.

4. A compound consisting of ether derivatives of morpholine represented by the structural formula

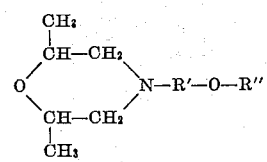

in which R′ is an alkylene group, and R″ is an alkyl group.

5. As a chemical compound, ethyl morpholine-ethyl ether, represented by the structural formula:

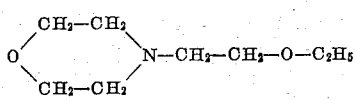

and having a boiling point of about 200° C. at 750 mm. pressure and 80° C. at 10 mm. pressure, a specific gravity of 0.9676 at 20° C., and an index of refraction of 1.4477 at 20° C.

6. As a chemical compound, methyl dimethyl-morpholine isopropyl ether, represented by the structural formula:

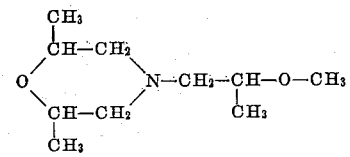

and being a liquid having a boiling point of about 40° C. at 12 mm. pressure.

7. A process for making ether derivatives of morpholine which comprises heating a 4 morpholine saturated lower alkyl alcohol with a dialkyl sulfate in the presence of an inorganic base.

8. A process for making N(β-ethoxy ethyl) morpholine which comprises heating N(β-ethanol) morpholine with diethyl sulfate in the presence of sodium hydroxide.

9. A process for making 2,6 dimethyl N(2 methoxy propyl) morpholine which comprises heating 2,6 dimethyl N(2-propanol) morpholine with dimethyl sulfate in the presence of sodium hydroxide.

HENRY L. COX.
THOMAS F. CARRUTHERS.